(12) United States Patent
Kuroi (10) Patent No.: US 8,649,091 B2
(45) Date of Patent: Feb. 11, 2014

(54) SCREEN UNIT

(75) Inventor: Kiyoshi Kuroi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/368,114

(22) Filed: Feb. 7, 2012

(65) Prior Publication Data

US 2012/0206801 A1    Aug. 16, 2012

(30) Foreign Application Priority Data

Feb. 10, 2011    (JP) ................... 2011-026871

(51) Int. Cl.
*G03B 21/56*    (2006.01)
(52) U.S. Cl.
USPC ......................... 359/461; 359/443
(58) Field of Classification Search
USPC ................................. 359/443, 461
See application file for complete search history.

(56) References Cited

U.S. PATENT DOCUMENTS

| | | | |
|---|---|---|---|
| 6,297,905 B1 * | 10/2001 | Takamoto et al. | 359/461 |
| 7,864,418 B2 * | 1/2011 | Kuroi et al. | 359/443 |
| 8,523,160 B2 * | 9/2013 | Wilturner | 269/86 |

FOREIGN PATENT DOCUMENTS

JP    09-034014    2/1997

* cited by examiner

*Primary Examiner* — Clayton E Laballe
*Assistant Examiner* — Kevin Butler
(74) *Attorney, Agent, or Firm* — Workman Nydegger (57) ABSTRACT

A screen unit includes a screen, a screen holding unit which holds the upper end of the screen, a screen winding unit around which the screen is wound, a pantograph mechanism which expands and stores the screen, and adjusting units which control the position of the upper end of the screen when the screen is expanded. The adjusting units have a support member which has a screw portion, and an adjusting screw member rotatably provided on the corresponding support member. The support member shifts in accordance with rotation of the adjusting screw member.

11 Claims, 4 Drawing Sheets

SCREEN UNIT

CROSS REFERENCE TO OTHER APPLICATION

The entire disclosure of Japanese patent Application No. 2011-26871, filed Feb. 10, 2011 is expressly incorporated by reference herein.

BACKGROUND

1. Technical Field

The present invention relates to a screen unit.

2. Related Art

A screen unit is known as a unit provided with a screen which reflects projection light projected from a projection type display apparatus such as a projector to display an image. A certain type of this screen unit known in the related art has a stretching and contracting mechanism which stretches and contracts the screen. The screen unit further has a holding unit which holds one end of the screen, and a winding unit which holds the other end of the screen as a component around which the screen is wound. The winding unit has a spring member which constantly exerts a pulling force on the screen in the winding direction.

Generally, the other end of the screen is fixed to the spring member or other parts within the winding unit via an adhesive double coated member, while the one end of the screen is fixed to the holding unit via a structure for fixation such as an adhesive double coated member or a structure which uses a fixing method such as pinching and insertion into a groove.

According to a screen for a projection type display apparatus disclosed in JP-A-9-34014, which screen is combined with the projector-incorporated projection type display apparatus into one body, a plurality of attachment plates for fixation of the outer periphery of the screen main body are attached to abase frame in such a condition that the attachment angles of the attachment plates with respect to the base frame can be arbitrarily controlled. In this case, the surface of the screen main body can be adjusted to a flat shape by using control screws capable of controlling the attachment angles of the attachment plates.

Generally, the flatness of a screen decreases by processing distortion during manufacture, change with an elapse of the use period, or for other reasons. The decrease in the flatness distorts a display image on the screen produced by the reflection of the light projected from the projector, which may degrade the image quality. Moreover, in case of the screen the parts of which in the area of the winding unit and the holding unit are completely fixed as in the above related art, these fixing positions cannot be easily adjusted after fixation of the screen. Therefore, sufficient positional accuracy is required at the time of fixation of the screen during the manufacture of the screen unit.

Accordingly, such a screen unit which has a structure simple and capable of easily controlling the flatness of the screen has been demanded.

SUMMARY

An advantage of some aspects of the invention is to solves at least a part of the aforementioned problems, and the invention can be implemented as the following forms or application examples.

APPLICATION EXAMPLE 1

This application example of the invention is directed to a screen unit including: a flexible and substantially rectangular screen; a holding unit which holds one end of the screen; a winding unit which holds the other end of the screen and functions as a component around which the screen is wound; a stretching and contracting mechanism which moves the holding unit close to and away from the winding unit to expand and store the screen; and an adjusting unit which adjusts the position of the one end of the screen when the screen is expanded by the stretching and contracting mechanism.

The screen unit of this application example includes the screen, the holding unit, the winding unit, the stretching and contracting mechanism, and the adjusting unit. The screen unit having this structure can easily control the flatness of the screen by adjusting the position of the one end of the screen by the function of the adjusting unit when the screen is expanded.

APPLICATION EXAMPLE 2

It is preferable that the adjusting unit of the screen unit according to the above application example of the invention makes adjustment by shifting the one end of the screen at least in either the expanding direction or the side direction of the screen.

According to the screen unit having this structure, the adjusting unit shifts the one end of the screen at least in either the expanding direction or the side direction for adjustment, thereby removing looseness of the screen. Accordingly, the flatness of the screen can be appropriately controlled.

APPLICATION EXAMPLE 3

It is preferable that the adjusting unit of the screen unit according to the above application example of the invention is disposed on the holding unit.

According to the screen unit having this structure, size enlargement of the screen unit can be avoided more effectively than such a structure which disposes the adjusting unit on other parts.

APPLICATION EXAMPLE 4

It is preferable that the adjusting unit of the screen unit according to the above application example of the invention includes a plurality of support members each of which supports the one end of the screen and has a screw portion, and a plurality of adjusting screw members each of which is rotatably provided on the corresponding support member of the plural support members. In this case, the plural support members shift in accordance with rotations of the plural adjusting screw members.

According to the screen unit having this structure, the adjusting unit has a simple structure provided with the plural support members and the corresponding plural adjusting screw members, and controls the flatness of the screen by shifting the plural support members supporting the one end of the screen in accordance with rotation of the plural adjusting screw members. Accordingly, the flatness of the screen can be corrected by easy adjustment, and raised to a high degree.

APPLICATION EXAMPLE 5

It is preferable that the plural adjusting screw members of the screen unit according to the above application example of the invention are disposed along the one end of the screen.

According to the screen unit having this structure, the plural adjusting screw members are located along the one end of the screen. In this case, the adjustments made by the respective adjusting screw members become uniform, which facilitates the control of the flatness of the screen.

APPLICATION EXAMPLE 6

It is preferable that the adjusting unit of the screen unit according to the above application example of the invention has the adjusting screw members provided at each of both ends of the holding unit to shift the support members located at each of both ends in the side direction in accordance with the movement of the corresponding adjusting screw members for adjustment in the side direction.

According to the screen unit having this structure, adjustment in the side direction is made by the movement of the support members located at both ends in the side direction in accordance with the rotation of the adjusting screw members provided at both ends. Thus, adjustment in the side direction can be facilitated.

APPLICATION EXAMPLE 7

It is preferable that each of the adjusting units of the screen unit according to the above application example of the invention has the adjusting screw member disposed at one end of the holding unit to shift the corresponding support member in the direction from the other end toward the one end of the holding unit in accordance with the movement of the adjusting unit, and an urging member disposed at the other end of the holding unit to pull the screen in the direction from the one end toward the other end of the holding unit, so as to make adjustment in the side direction.

According to this application example of the invention, the screen unit has the urging member disposed at the other end of the holding unit. In this case, adjustment in the side direction can be made only by controlling the adjusting screw member disposed at the one end of the holding unit. Accordingly, adjustment in the side direction of the screen can be further facilitated.

APPLICATION EXAMPLE 8

It is preferable that the stretching and contracting mechanism of the screen unit according to the above application example of the invention is a link mechanism.

According to the screen unit having this structure, the stretching and contracting mechanism is constituted by the link mechanism (such as pantograph mechanism). Thus, the structure of the stretching and contracting mechanism can be simplified.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described with reference to the drawings.

Embodiment

Figure 1A:
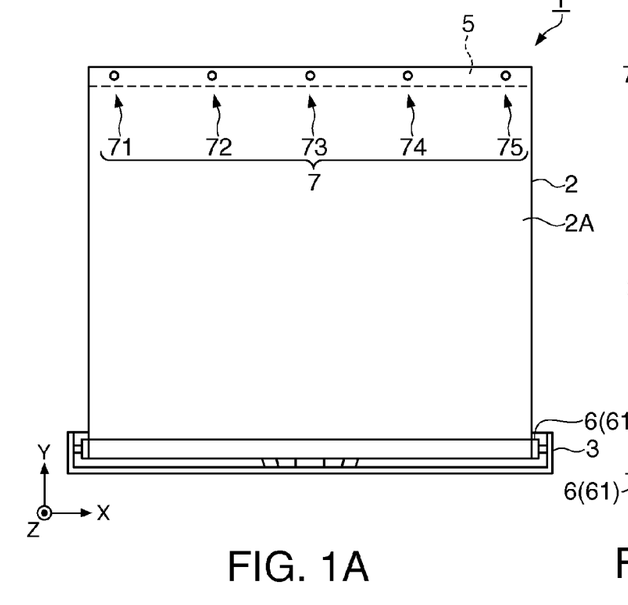
FIGS. 1A through 1C illustrate a screen unit according to an embodiment.
Figure 1B:
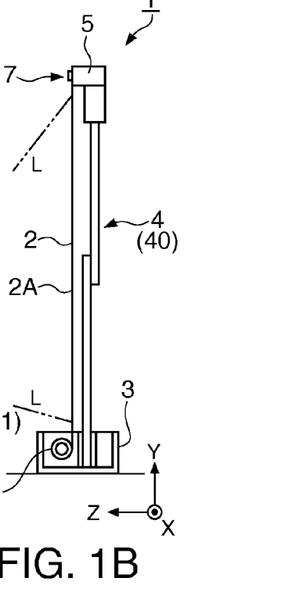
Figure 1C:
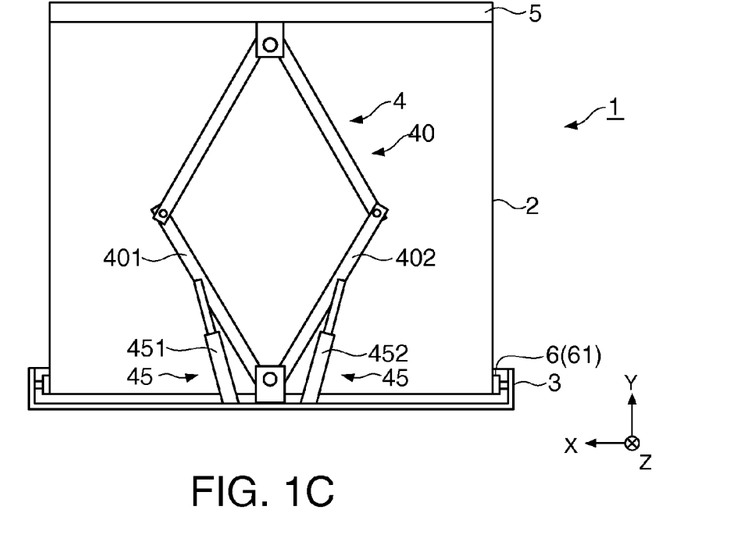

FIGS. 1A through 1C illustrate a screen unit 1 according to this embodiment. FIG. 1A is a plan view schematically illustrating the screen unit 1 as viewed from the front. FIG. 1B is a side view schematically illustrating the screen unit 1. FIG. 1C is a plan view schematically illustrating the screen unit 1 as viewed from the rear. FIGS. 1A through 1C schematically illustrate the interior of a housing 3 as well. The general structure of the screen unit 1 according to this embodiment is briefly described with reference to FIGS. 1A through 1C.

The screen unit 1 in this embodiment is a reflection type screen unit 1 placed on a floor surface F for installation, for example. For use of the screen unit 1, a flexible and substantially rectangular screen 2 of the screen unit 1 is drawn in the upward direction (direction substantially perpendicular to the floor surface F) from the inside of the housing 3 having a rectangular parallelepiped box shape, in which condition the screen 2 stands with respect to the floor surface F and comes into a usable condition. The screen 2 reflects projection light L emitted from a projector placed on a desk top or other locations such that the projection light L can reach an observer.

In the respective figures including FIGS. 1A and 1B, dimensions and proportions of the components shown therein are different from the actual ones so that these components can be visually recognized in the figures. Moreover, in the respective figures including FIGS. 1A and 1B, the components are shown by using an XYZ rectangular coordinate system for convenience of explanation. In this XYZ rectangular coordinate system, a Y direction corresponds to the direction perpendicular to the floor surface F (+Y direction: direction toward the screen 2 in the standing condition from the floor surface F), an X direction corresponds to the direction parallel with a reflection surface 2A of the standing screen 2 and perpendicular to the Y direction (+X direction: right direction as viewed from the front of the reflection surface 2A of the screen 2 in the standing condition), and a Z direction corresponds to the direction perpendicular to the Y direction and the X direction (+Z direction: direction toward the front from the reflection surface 2A of the screen 2 in the standing condition). Furthermore, the direction of gravity corresponds to the downward direction, and the direction opposite to the direction of gravity corresponds to the upward direction, both determined based on the direction of gravity.

As illustrated in FIGS. 1A through 1C, the screen unit 1 includes the screen 2 and the housing 3. The housing 3 accommodates a link mechanism provided as a stretching and contracting mechanism in such a condition that the link mechanism can freely stretch and contract. More specifically, the link mechanism in this embodiment is constituted by a pantograph mechanism 4 which has a plurality of arms 40 and cylinder units 45 provided as driving units for stretching and contracting the arms 40.

A screen holding unit 5 provided at the upper end of the pantograph mechanism 4 holds the upper end of the screen 2 defined as one end of the screen 2. The lower end of the screen 2 defined as the other end of the screen 2 is fixed to a spring-type screen winding unit 6 disposed inside the housing 3.

The screen winding unit 6 is provided with a winding shaft 61 having a length substantially equivalent to the length of the screen 2 in the width direction (X direction). The screen winding unit 6 contains a spring member (not shown) which constantly exerts a pulling force on the screen 2 in the winding direction.

As noted above, the pantograph mechanism 4 has the cylinder units 45. The cylinder units 45 are constituted by two cylinders 451 and 452. The cylinders 451 and 452 are connected with a first arm 401 and a second arm 402 of the arms 40, respectively. In response to actuation of the cylinder units 45, the cylinders 451 and 452 push the first arm 401 and the second arm 402 connected therewith in the upward direction, whereby the arms 40 shift in the stretching direction. These actions allow the screen 2 to be drawn from the screen winding unit 6 and expanded into the condition illustrated in FIGS. 1A through 1C.

On the other hand, when the cylinders 451 and 452 lower the first arm 401 and the second arm 402 in response to the operation of the cylinder units 45, the arms 40 shift in the contracting direction. These actions allow the screen 2 to be wound around the screen winding unit 6 and stored within the housing 3. As explained above, the pantograph mechanism 4 expands and stores the screen 2 by moving the screen holding unit 5 close to and away from the screen winding unit 6.

As illustrated in FIG. 1A, the screen holding unit 5 has adjusting units 7 which shift the upper end of the screen in the expanding direction (Y direction) and the side direction (X direction) for fine adjustment of the expanded condition of the screen 2. According to this embodiment, the five adjusting units 7 are provided at five points of the screen holding unit 5. In other words, the five adjusting unit 7 are equipped along the upper end of the screen 2. As can be seen from FIG. 1A, the adjusting units 7 are constituted by adjusters 71, 72, 73, 74, and 75 disposed in this order from the left. The adjusting units 7 make fine adjustment both in the expanding direction (Y direction) by using the adjusters 71, 72, 73, 74, and 75, and in the side direction (X direction) by using the adjusters 71 and 75 located at both ends in the side direction.

FIGS. 2A through 4E illustrate the respective adjusting units 7.

Figure 2A:
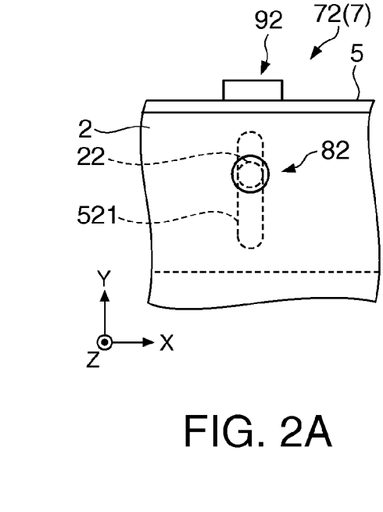
FIGS. 2A through 2C illustrate an adjuster.
Figure 2B:
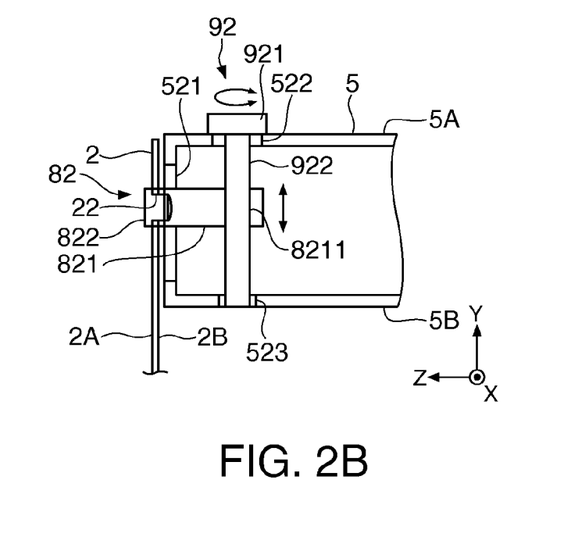
Figure 2C:
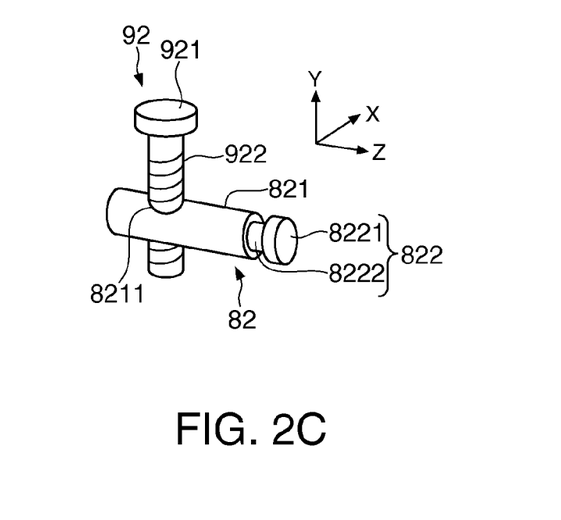

More specifically, FIGS. 2A through 2C show the adjuster 72. FIG. 2A is a plan view of the adjuster 72. FIG. 2B is a cross-sectional view of the adjuster 72. FIG. 2C is a perspective view of a support member 82 and an adjusting screw member 92 of the adjuster 72.

Figure 3A:
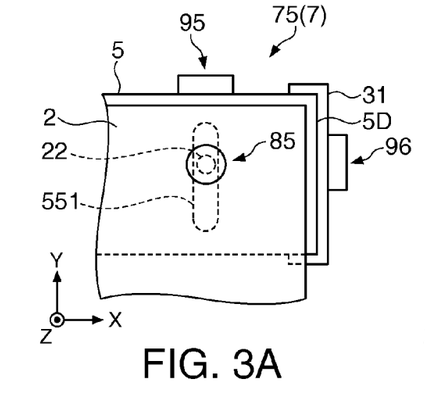
FIGS. 3A through 3E illustrate another adjuster.
Figure 3B:
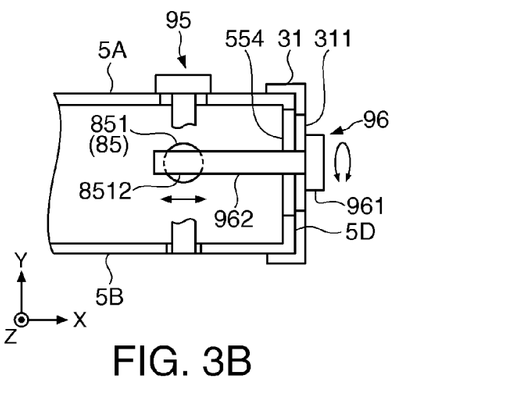
Figure 3C:
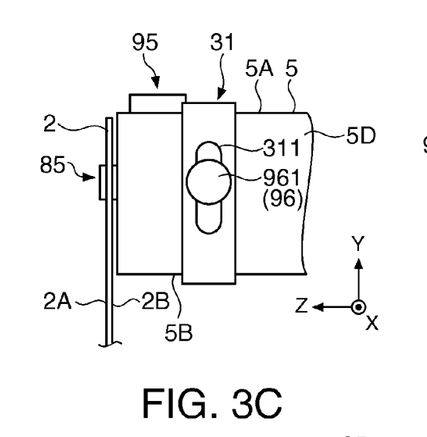
Figure 3D:
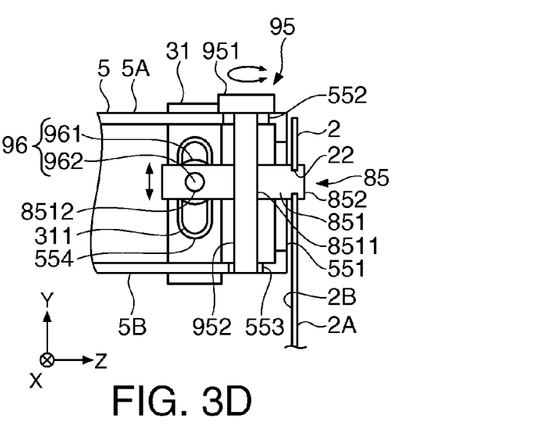
Figure 3E:
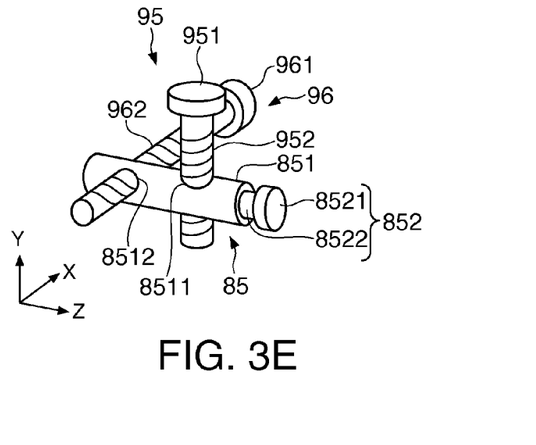

FIGS. 3A through 3E show the adjuster 75. FIG. 3A is a plan view of the adjuster 75. FIG. 3B is a cross-sectional view of the adjuster 75. FIG. 3C is a side view of the adjuster 75. FIG. 3D is a cross-sectional view of the adjuster 75. FIG. 3E is a perspective view of a support member 85 and adjusting screw members 95 and 96 of the adjuster 75.

Figure 4A:
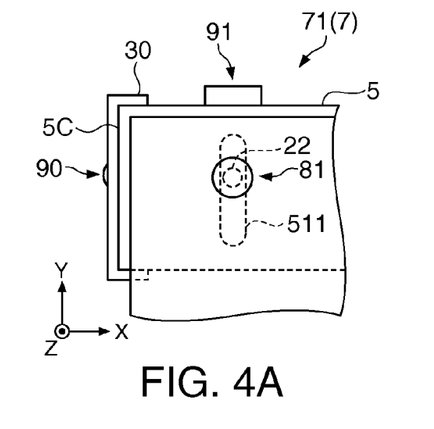
FIGS. 4A through 4E illustrate a further adjuster.
Figure 4B:
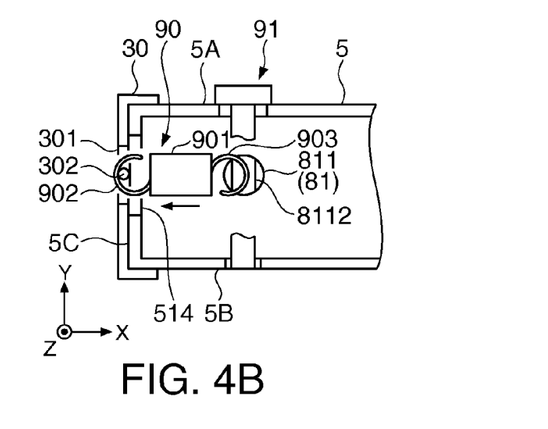
Figure 4C:
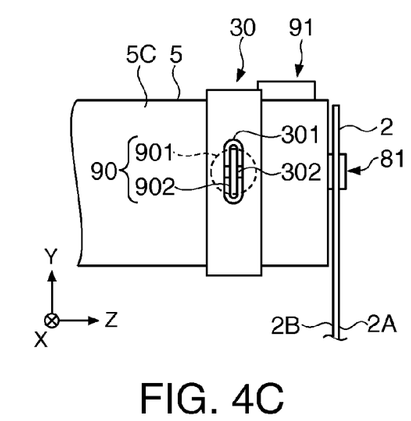
Figure 4D:
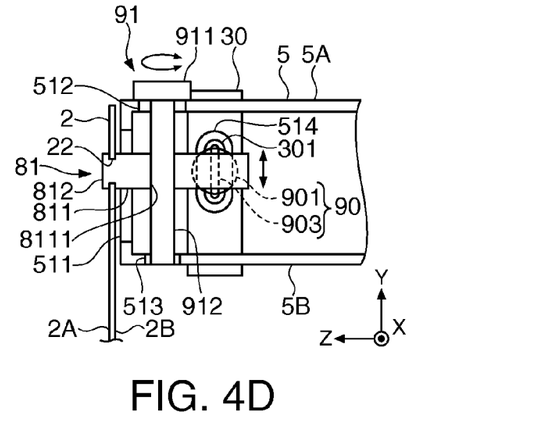
Figure 4E:
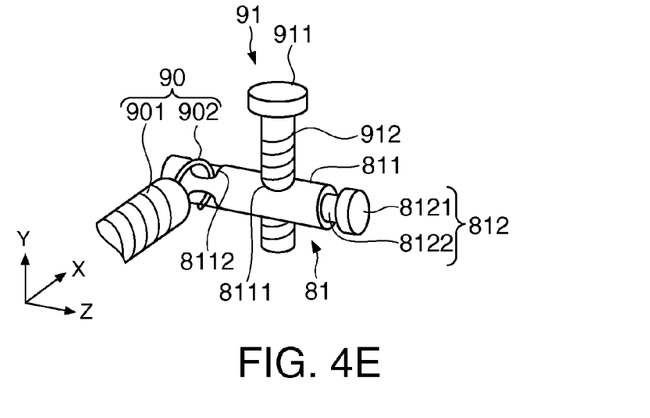

FIGS. 4A through 4E show the adjuster 71. FIG. 4A is a plan view of the adjuster 71. FIG. 4B is a cross-sectional view of the adjuster 71. FIG. 4C is a side view of the adjuster 71. FIG. 4D is a cross-sectional view of the adjuster 71. FIG. 4E is a perspective view of a support member 81, an adjusting screw member 91, and an urging member (urging spring 90) of the adjuster 71.

The structure and operation of the adjusting units 7 are now explained with reference to FIGS. 2A through 4E.

Initially, the structure and operation of the adjusters 72, 73, and 74 are discussed.

The adjusters 72, 73, and 74 are provided to shift the upper end of the screen 2 in the expanding direction (Y direction) for adjustment. Since the three adjusters 72, 73, and 74 have similar structures and operate in similar manners, only the structure and operation of the adjuster 72 are herein described with reference to FIGS. 2A through 2C for convenience of explanation.

As illustrated in FIG. 2C, the adjuster 72 includes the support member 82 and the adjusting screw member 92. The support member 82 as a component for holding the upper end of the screen 2 has a cylindrical support member main body 821, and a fixing portion 822 calked for fixation to the support member main body 821. The support member main body 821 has a screw hole 8211 as a screw portion threaded to engage with the adjusting screw member 92 (described later). The fixing portion 822 has a large-diameter portion 8221 and a small-diameter portion 8222. For attaching the fixing portion 822 to the screen 2 as one body, the small-diameter portion 8222 is inserted into a fixing hole 22 formed in the screen 2, and calked for fixation to the support member main body 821. For junction with the screen 2 as one body, the fixing portion 822 may be fixed to the support member main body 821 by other appropriate methods such as screwing and bonding as well as calking employed in this embodiment.

The fixing portion 822 (large-diameter portion 8221) of the support member 82 is positioned on the reflection surface 2A side of the screen 2, while the support member main body 821 of the support member 82 is positioned on a rear surface 2B side of the screen 2. The screen holding unit 5 has an elongated hole 521 into which the support member main body 821 of the support member 82 is inserted so as to allow the support member 82 to freely shift in the stretching direction (Y direction).

The adjusting screw member 92 as a component for shifting the support member 82 in the expanding direction has a head 921 and a shaft portion 922. The outer surface of the shaft portion 922 other than the tip and the head 921 side end thereof are threaded. The screen holding unit 5 has receiving holes 522 and 523 in an upper surface 5A and a bottom surface 5B of the screen holding unit 5, respectively, through which holes 522 and 523 the adjusting screw member 92 is inserted so as to allow engagement between the adjusting screw member 92 and the support member 82 and shift of the adjusting screw member 92 in the side direction of the screen 2.

As illustrated in FIG. 2B, the shaft portion 922 of the adjusting screw member 92 inserted through the receiving hole 522 engages with the screw hole 8211 of the support member 82 positioned inside the screen holding unit 5 with the tip of the shaft portion 922 inserted into the receiving hole 523. The receiving hole 522 receives the head 921 of the adjusting screw member 92 such that the head 921 can freely shift, while the receiving hole 523 receives the tip of the shaft portion 922 of the adjusting screw member 92 such that the tip can freely shift.

The respective components explained above are all equipped on the adjuster 72.

The adjusting screw member 92 of the adjuster 72, adjusting screw members (not shown) of the adjusters 73 and 74, and the adjusting screw members 95 and 91 of the adjusters 75 and 71 (described later) are disposed along the one end (upper end) of the screen 2. Similarly, the support member 82 of the adjuster 72, support members (not shown) of the adjusters 73 and 74, and the support members 85 and 81 of the adjusters 75 and 71 (described later) are disposed along the one end (upper end) of the screen 2.

The method of adjustment by using the adjuster 72 (operation of adjuster 72) is now explained.

For adjustment by the adjuster 72, the head 921 of the adjusting screw member 92 provided on the upper surface 5A of the screen holding unit 5 is rotated after expansion of the screen 2. More specifically, when the head 921 rotates, the support member 82 engaging with the shaft portion 922 shifts in the expanding direction (upward (+Y direction) or downward (−Y direction)) in accordance with the rotation of the head 921. By the shift of the support member 82 in the expanding direction, the upper end of the screen 2 shifts in the expanding direction.

This operation of the adjuster 72 is executed to make fine adjustment of the screen 2 in the expanding direction. The adjuster 72 provided for fine adjustment of the screen 2 in the expanding direction corrects bending (flatness decrease) of the screen 2 produced at the time of expansion of the screen 2, thereby increasing the degree of flatness of the screen 2.

Each of the adjusters 73 and 74 is structured and operated similarly to the adjuster 72. Thus, the adjusters 73 and 74 can make fine adjustment of the screen 2 in the expanding direction in a manner similar to the adjustment by the adjuster 72.

The structure and operation of the adjuster 75 are now explained with reference to FIGS. 3A through 3E.

The adjuster 75 has a structure for fine adjustment of the screen 2 achieved by shifting the upper end of the screen 2 in the expanding direction (Y direction) similarly to the adjusters 72, 73, and 74, and further a structure for fine adjustment of the screen 2 achieved by shifting the upper end of the screen 2 in the side direction (X direction). At the time of adjustment in the side direction (X direction), the adjuster 75 operates in cooperation with the adjuster 71, details of which will be described later.

As illustrated in FIG. 3E, the adjuster 75 has the support member 85 and the two adjusting screw members 95 and 96. The support member 85 as a component for holding the upper end of the screen 2 has a structure similar to that of the support member 82. The support member 85 has a support member main body 851 and a fixing portion 852 similar to the support member main body 821 and the fixing portion 822 of the support member 82.

The fixing portion 852 has a large-diameter portion 8521 and a small-diameter portion 8522 similar to the large-diameter portion 8221 and the small-diameter portion 8222 of the fixing portion 822 of the support member 82. The support member main body 851 has a screw hole 8511 similar to the screw hole 8211 of the support member main body 821 of the support member 82. However, the support member main body 851 is different from the corresponding part of the support member 82 in that a screw hole 8512 is further provided as a screw portion threaded to engage with the adjusting screw member 96 (described later).

The support member 85 is combined with the screen 2 as one body by insertion of the small-diameter portion 8522 of the fixing portion 852 into the fixing hole 22 of the screen 2 and fixation of the fixing portion 852 to the support member main body 851 by calking similarly to the support member 82. The fixing portion 852 (large-diameter portion 8521) of the support member 85 is positioned on the reflection surface 2A side of the screen 2, while the support member main body 851 of the support member 85 is positioned on the rear surface 2B side of the screen 2, similarly to the support member 82.

The screen holding unit 5 has an elongated hole 551 similar to the elongated hole 521, into which elongated hole 551 the support member main body 851 of the support member 85 is inserted to allow the support member 85 to freely shift in the stretching direction (Y direction).

The adjusting screw member 95 as a component for shifting the support member 85 in the expanding direction has a structure similar to that of the adjusting screw member 92. The adjusting screw member 95 has a head 951 and a shaft portion 952 similar to the head 921 and the shaft portion 922 of the adjusting screw member 92. The screen holding unit 5 has receiving holes 552 and 553 similar to the receiving holes 522 and 523.

As illustrated in FIG. 3D, the shaft portion 952 of the adjusting screw member 95 inserted through the receiving hole 552 engages with the screw hole 8511 of the support member 85 positioned inside the screen holding unit 5 with the tip of the shaft portion 952 inserted into the receiving hole 553. The receiving hole 552 receives the head 951 of the adjusting screw member 95 such that the head 951 can freely shift. The receiving hole 553 receives the tip of the shaft portion 952 of the adjusting screw member 95 such that the tip can freely shift.

The adjusting screw member 96 as a component for shifting the support member 85 in the side direction (X direction) has a structure similar to that of the adjusting screw member 92. The adjusting screw member 96 has a head 961 and a shaft portion 962 similar to the head 921 and the shaft portion 922 of the adjusting screw member 92.

As illustrated in FIGS. 3B and 3C, a receiving plate 31 for receiving the adjusting screw member 96 is provided on a right side surface 5D of the screen holding unit 5 in such a condition as to pinch the upper surface 5A and the bottom surface 5B of the screen holding unit 5. The receiving plate 31 has an elongated hole 311 which allows shift of the support member 85 in the expanding direction and receives the head 961 of the adjusting screw member 96. As illustrated in FIG. 3B, a large elongated hole 554 larger than the elongated hole 311 is formed in the right side surface 5D of the screen holding unit 5 at a position opposed to the elongated hole 311.

As illustrated in FIGS. 3B and 3D, the shaft portion 962 of the adjusting screw member 96 is inserted through the elongated hole 311 and the elongated hole 554 for engagement with the screw hole 8512 of the support member 85 positioned inside the screen holding unit 5.

The respective components explained above are all equipped on the adjuster 75.

The method of adjustment by using the adjuster 75 (operation of adjuster 75) is now explained.

For adjustment by the adjuster 75, the adjusting screw members are rotated in the same manner as the operation of the adjuster 72. Adjustment by the adjuster 75 in the expanding direction, after the screen 2 is expanded, is achieved by rotating the head 951 of the adjusting screw member 95 provided on the upper surface 5A of the screen holding unit 5, while adjustment by the adjuster 75 in the side direction is achieved by rotating the head 961 of the adjusting screw member 96 provided on the right side surface 5D of the screen holding unit 5.

More specifically, when the head 951 of the adjusting screw member 95 rotates, the support member 85 engaging with the shaft portion 952 shifts in the expanding direction (upward (+Y direction) or downward (−Y direction)) in accordance with the rotation of the head 951. By the shift of the support member 85 in the expanding direction, the screen 2 moves in the expanding direction for fine adjustment.

On the other hand, when the head 961 of the adjusting screw member 96 rotates, the support member 85 engaging with the shaft portion 962 shifts in the side direction (right (+X direction) or left (−X direction)) in accordance with the rotation of the head 961. By the shift of the support member 85 in the side direction, the screen 2 moves in the side direction for fine adjustment.

These operations of the adjuster 75 make fine adjustment of the screen 2 in both the expanding direction and the side direction when the screen 2 is bended in the expanded condition, thereby correcting the bending and improving the flatness of the screen 2. The adjustment by the adjuster 75 in the side direction is executed in cooperation with the adjuster 71 (more precisely, with the adjusters 72 through 74 as well) explained below.

The structure and operation of the adjuster 71 are now explained with reference to FIGS. 4A through 4E.

The adjuster 71 has a structure for fine adjustment of the screen 2 achieved by shifting the upper end of the screen 2 in the expanding direction (Y direction) similarly to the adjusters 72, 73, 74, and 75 and further a structure for fine adjustment of the screen 2 achieved by shifting the upper end of the screen 2 in the side direction (X direction). For adjustment in the side direction (X direction), the adjuster 71 operates in cooperation with the adjuster 75.

As illustrated in FIG. 4E, the adjuster 71 includes the support member 81, the adjusting screw member 91, and the urging spring 90 as an urging member. The support member 81 as a component for holding the upper end of the screen 2 has a structure substantially similar to that of the support member 82. The support member 81 has a support member main body 811 and a fixing portion 812 similar to the support member main body 821 and the fixing portion 822 of the support member 82.

The fixing portion 812 has a large-diameter portion 8121 and a small-diameter portion 8122 similar to the large-diameter portion 8221 and the small-diameter portion 8222 of the fixing portion 822 of the support member 82. The support member main body 811 has a screw hole 8111 similar to the screw hole 8211 of the support member main body 821 of the support member 82. However, the support member main body 811 is different from the corresponding part of the support member 82 in that a receiving hole 8112 engaging with the urging spring 90 (described later) is further provided.

The support member 81 is combined with the screen 2 as one body by insertion of the small-diameter portion 8122 of the fixing portion 812 into the fixing hole 22 of the screen 2 and fixation of the fixing portion 812 to the support member main body 811 by calking similarly to the support member 82. The fixing portion 812 (large-diameter portion 8121) of the support member 81 is positioned on the reflection surface 2A side of the screen 2, while the support member main body 811 of the support member 81 is positioned on the rear surface 2B side of the screen 2, similarly to the support member 82.

The screen holding unit 5 has an elongated hole 511 similar to the elongated hole 521, into which elongated hole 511 the support member main body 811 of the support member 81 is inserted to allow the support member 81 to freely shift in the stretching direction (Y direction).

The adjusting screw member 91 as a component for shifting the support member 81 in the expanding direction has a structure similar to that of the adjusting screw member 92. The adjusting screw member 91 has ahead 911 and a shaft portion 912 similar to the head 921 and the shaft portion 922 of the adjusting screw member 92. The screen holding unit 5 has receiving holes 512 and 513 similar to the receiving holes 522 and 523.

As illustrated in FIG. 4D, the shaft portion 912 of the adjusting screw member 91 inserted through the receiving hole 512 engages with the screw hole 8111 of the support member 81 positioned inside the screen holding unit 5 with the tip of the shaft portion 912 inserted into the receiving hole 513. The receiving hole 512 receives the head 911 of the adjusting screw member 91 such that the head 911 can freely shift. The receiving hole 513 receives the tip of the shaft portion 912 of the adjusting screw member 91 such that the tip can freely shift.

The urging spring 90 is constituted by a so-called tension spring. The urging spring 90 is a component for shifting the support member 81 in the side direction, more specifically, a component for pulling the support member 81 in the −X direction. The urging spring 90 has a spring main body 901 and hooks 902 and 903 disposed at both ends of the spring main body 901.

As illustrated in FIGS. 4B and 4C, a receiving plate 30 for receiving the urging spring 90 is provided on a left side surface 5C of the screen holding unit 5 in such a condition as to pinch the upper surface 5A and the bottom surface 5B of the screen holding unit 5. The receiving plate 30 has an elongated hole 301 which includes a receiving portion 302 capable of engaging with the hook 902 of the urging spring 90 (in such a manner that the hook 902 can be hooked to the receiving portion 302). As illustrated in FIG. 4B, a hole 514 larger than the outside diameter of the hook 902 is formed in the left side surface 5C of the screen holding unit 5.

As illustrated in FIGS. 4B and 4C, the urging spring 90 is hooked to the receiving portion 302 after insertion of the hook 902 into the hole 514 and the elongated hole 301. Similarly, the other hook 903 is hooked to the receiving hole 8112 of the support member 81.

The respective components explained above are all equipped on the adjuster 71.

The method of adjustment by using the adjuster 71 (operation of adjuster 71) is now explained.

For adjustment by the adjuster 71, the adjusting screw member 91 is rotated in the same manner as the operation of the adjuster 72. Adjustment by the adjuster 71 in the expanding direction is achieved by rotating the head 911 of the adjusting screw member 91 provided on the upper surface 5A of the screen holding unit 5 after the screen 2 is expanded. On the other hand, adjustment by the adjuster 71 in the side direction is achieved in cooperation with the adjuster 75.

More specifically, when the head 911 of the adjusting screw member 91 rotates, the support member 81 engaging with the shaft portion 912 shifts in the expanding direction (upward (+Y direction) or downward (−Y direction)) in accordance with the rotation of the head 911. By the shift of the support member 81 in the expanding direction, the screen 2 moves in the expanding direction for fine adjustment.

The urging spring 90 provided on the left side surface 5C of the screen holding unit 5 pulls the support member 81 in the side direction (−X direction). According to this structure, adjustment by the adjuster 71 in the side direction is made based on the balance between the force of the urging spring 90 for pulling the support member 81 in the −X direction and the force of the adjusting screw member 96 of the adjuster 75 for pulling the support member 85 in the side direction.

As a consequence of the adjustments by the adjusters 71 and 75 in the side direction, the support members 81 and 85 shift in the side direction (right direction (+X direction) or left direction (−X direction)). Moreover, the respective support members of the adjusters 72 through 74 follow the shifts of the support members 81 and 85 in the side direction. By the shifts of the support members 81 and 85 (and shifts of other support members) in the side direction, the screen 2 moves in the side direction for fine adjustment.

Accordingly, bending of the screen 2 produced at the time of expansion can be corrected by fine adjustment both in the expanding direction and the side direction achieved by using the adjuster 71. Thus, the degree of flatness increases. The adjustment by the adjuster 71 in the side direction is made in cooperation with the adjuster 75 (more precisely, with the adjusters 72 through 74 as well).

According to this embodiment, the following advantages can be offered.

The screen unit 1 in this embodiment includes the screen holding unit 5, the screen winding unit 6, the pantograph mechanism 4, and the adjusting units 7. At the time of expansion of the screen 2, adjustment which shifts the upper end of the screen 2 both in the expanding direction and the side direction is made by using the adjusting units 7 so as to remove looseness of the screen 2. Thus, the flatness of the screen 2 is appropriately controlled by the screen unit 1.

According to the screen unit 1 in this embodiment, the adjusting units 7 constituted by the plural adjusters 71 through 75 have a simple structure provided with the plural support members 81, 82, and 85 and the corresponding plural adjusting screw members 91, 92, 95, and 96. Thus, the structure of the screen unit 1 for controlling the flatness of the screen 2 can be simplified. Moreover, the flatness of the screen 2 can be corrected only by simple adjustment which shifts the plural support members 81, 82, and 85 supporting the upper end of the screen 2 in accordance with rotation of the plural adjusting screw members 91, 92, 95, and 96 engaging with the screw holes 8111, 8211, 8511, and 8512 of the support members 81, 82, and 85. Accordingly, the flatness of the screen 2 can be controlled by easy adjustment, and raised to a high degree.

According to the screen unit 1 in this embodiment, the adjusting units 7 are provided on the screen holding unit 5. Thus, size enlargement of the screen unit 1 can be avoided more effectively than such a structure which disposes the adjusting units 7 on other parts.

According to the screen unit 1 in this embodiment, the plural adjusting screw members 91, 92, and 95 are located on the screen holding unit 5 along the upper end of the screen 2. In this case, the adjustments made by the respective adjusting screw members 91, 92, and 95 become uniform, which facilitates the control of the flatness of the screen 2 (particularly in the expanding direction).

According to the screen unit 1 in this embodiment, there are equipped the adjuster 71 (urging spring 90) disposed on the left side surface 5C of the screen holding unit 5 for pulling the screen 2, and the adjuster 75 (adjusting screw member 96) disposed on the right side surface 5D of the screen holding unit 5 and allowing the support member 85 to follow the movement of the adjusting screw member 96. According to this structure, the screen unit 1 can control the screen 2 in the side direction only by adjusting the one adjusting screw member 96, thereby making fine adjustment with ease in the side direction.

According to the screen unit 1 in this embodiment, the stretching and contracting mechanism is constituted by the pantograph mechanism 4 as the link mechanism. Thus, the structure of the stretching and contracting mechanism can be simplified.

The invention is not limited to the embodiment described herein but may be practiced otherwise without departing from the scope of the invention. Therefore, various modifications, improvements and the like including the following changes may be made.

The screen unit 1 in this embodiment includes the adjuster 71 which has the urging spring 90 as the urging member disposed on the left side surface 5C of the screen holding unit 5, and further the adjuster 75 which has the adjusting screw member 96 disposed on the right side surface 5D. However, an adjusting screw member similar to the adjusting screw member 96 may be provided in lieu of the urging member. In this case, the control of the screen 2 in the side direction can be easily made by the adjustments via both the adjusting screw members.

The screen unit 1 in this embodiment includes the adjuster 71 which has the urging spring 90 disposed on the left side surface 5C of the screen holding unit 5 and the adjuster 75 which has the adjusting screw member 96 disposed on the right side surface 5D. However, the adjuster 75 having the adjusting screw member 96 may be disposed on the left side surface 5C with the adjuster 71 with the urging spring 90 disposed on the right side surface 5D.

The screen unit 1 in this embodiment has the five adjusting units 7. However, the number of the adjusting units 7 is not limited to five. For example, two adjusting units maybe equipped for adjustments in the expanding direction and the side direction.

The screen unit 1 in this embodiment controls the screen 2 both in the expanding direction and the side direction by using the adjusting units 7. However, the adjustment may be made only in either the expanding direction or the side direction. In this case, an adjusting unit which only makes adjustment in either the expanding direction or the side direction may be employed.

What is claimed is:

1. A screen unit comprising:
a flexible and substantially rectangular screen;
a holding unit which holds one end of the screen;
a winding unit which holds the other end of the screen and functions as a component around which the screen is wound;
a stretching and contracting mechanism which moves the holding unit close to and away from the winding unit to expand and store the screen; the screen having a pair of peripheral sides extending from the one end to the other end; and
an adjusting unit which adjusts the position of the one end of the screen when the screen is expanded by the stretching and contracting mechanism, wherein the adjusting unit comprise a plurality of selectively adjustable support members that adjust the one end of the screen in a direction that is planar to the screen and towards or away from one of the peripheral sides in a direction perpendicular to the direction in which the screen is expanded by the stretching and contracting mechanism.

2. The screen unit according to claim 1, wherein the adjusting unit makes adjustment by shifting the one end of the screen at least in either the expanding direction or the side direction of the screen.

3. The screen unit according to claim 2, wherein the adjusting unit is disposed on the holding unit.

4. The screen unit according to claim 1, wherein the adjusting unit includes
a plurality of support members each of which supports the one end of the screen and has a screw portion, and
a plurality of adjusting screw members each of which is rotatably provided on the corresponding support member of the plural support members, wherein the plurality of support members shift in accordance with rotations of the plural adjusting screw members.

5. The screen unit according to claim 4, wherein the plurality of adjusting screw members are disposed along the one end of the screen.

6. The screen unit according to claim 5, wherein the adjusting unit has the adjusting screw members provided at each of both ends of the holding unit to shift the support members located at each of both ends in the side direction in accordance with the movement of the corresponding adjusting screw members for adjustment in the side direction.

7. The screen unit according to claim 5, wherein the adjusting unit has the adjusting screw member disposed at one end of the holding unit to shift the corresponding support member in the direction from the other end toward the one end of the holding unit in accordance with the movement of the adjusting unit, and an urging member disposed at the other end of the holding unit to pull the screen in the direction from the one end toward the other end of the holding unit, so as to make adjustment in the side direction.

8. The screen unit according to claim 1, wherein the stretching and contracting mechanism is a link mechanism.

9. The screen unit according to claim 1, wherein the adjusting unit comprises a plurality of selectively adjustable support members that adjust the one end of the screen in a direction that is planar to the screen.

10. A screen unit comprising:
a flexible and substantially rectangular screen;
a holding unit which holds one end of the screen;
a winding unit which holds the other end of the screen and functions as a component around which the screen is wound;
a stretching and contracting mechanism which moves the holding unit close to and away from the winding unit to expand and store the screen, the screen having a pair of peripheral sides extending from the one end to the other end; and
an adjusting unit which adjusts the position of the one end of the screen in a direction that is in plane with the screen when the screen is expanded by the stretching and contracting mechanism, wherein the adjusting unit includes
a plurality of support members each of which supports the one end of the screen and has a screw portion, and
a plurality of adjusting screw members each of which is rotatably provided on the corresponding support member of the plural support members, wherein the plurality of support members shift in accordance with rotations of the plural adjusting screw members; and
wherein the adjusting unit has the adjusting screw members provided at each of both ends of the holding unit to shift the support members located at each of both ends towards or away from one of the peripheral sides in the side direction, which is a direction perpendicular to the direction in which the screen is expanded by the stretching and contracting mechanism, in accordance with the movement of the corresponding adjusting screw members for adjustment in the side direction.

11. A screen unit comprising:
a flexible and substantially rectangular screen;
a holding unit which holds one end of the screen;
a winding unit which holds the other end of the screen and functions as a component around which the screen is wound;
a stretching and contracting mechanism which moves the holding unit close to and away from the winding unit to expand and store the screen, the screen having a pair of peripheral sides extending from the one end to the other end; and
an adjusting unit which adjusts the position of the one end of the screen in a direction that is in plane with the screen when the screen is expanded by the stretching and contracting mechanism, wherein the adjusting unit includes
a plurality of support members each of which supports the one end of the screen and has a screw portion, and
a plurality of adjusting screw members each of which is rotatably provided on the corresponding support member of the plural support members, wherein the plurality of support members shift in accordance with rotations of the plural adjusting screw members; and
wherein the adjusting unit has the adjusting screw member disposed at one end of the holding unit to shift the corresponding support member in the direction from the other end toward the one end of the holding unit in accordance with the movement of the adjusting unit, and an urging member disposed at the other end of the holding unit to pull the support member towards or away from one of the peripheral sides in a side direction, which is a direction perpendicular to the direction in which the screen is expanded by the stretching and contracting mechanism, to move the screen in the direction from the one end toward the other end of the holding unit, so as to make adjustment in the side direction.

* * * * *